United States Patent [19]
Orbach et al.

[11] Patent Number: 6,041,867
[45] Date of Patent: Mar. 28, 2000

[54] HITCH INITIALIZATION CONTROL SYSTEM

[75] Inventors: Abraham Orbach, Naperville; William L. Schubert, Downers Grove, both of Ill.

[73] Assignee: Case Corporation, Racine, Wis.

[21] Appl. No.: 08/689,417

[22] Filed: Aug. 9, 1996

[51] Int. Cl.[7] .................................................. A01B 41/06
[52] U.S. Cl. .................................................. 172/2; 701/50
[58] Field of Search .................................. 172/2, 3, 6, 4, 172/4.5, 7, 26, 75; 364/424.07, 424.05, 148; 280/416.2; 701/50

[56] References Cited

U.S. PATENT DOCUMENTS

| | | |
|---|---|---|
| 3,860,074 | 1/1975 | Maistrelli . |
| 4,191,913 | 3/1980 | Arnold et al. . |
| 4,343,365 | 8/1982 | Rajogopal et al. . |
| 4,518,044 | 5/1985 | Wiegardt et al. . |
| 4,571,500 | 2/1986 | Mucheyer . |
| 4,677,542 | 6/1987 | Kasten . |
| 4,837,691 | 6/1989 | Boe et al. . |
| 4,883,128 | 11/1989 | O'Neall et al. ........................ 172/26 X |
| 4,969,527 | 11/1990 | Boe et al. . |
| 5,170,849 | 12/1992 | Nikkel et al. ................................ 172/6 |
| 5,421,416 | 6/1995 | Orbach et al. . |
| 5,469,921 | 11/1995 | Orback et al. ................................ 172/4 |
| 5,472,056 | 12/1995 | Orbach ................................... 172/7 X |
| 5,505,267 | 4/1996 | Orbach et al. ................................ 172/3 |
| 5,549,166 | 8/1996 | Orbach et al. ................................ 172/4 |
| 5,557,510 | 9/1996 | McIntyre et al. ..................... 172/75 X |

FOREIGN PATENT DOCUMENTS 0 153 102 A2  9/1985  European Pat. Off. .

OTHER PUBLICATIONS

MX–6 Owners Manual, Jan. 1994.

*Primary Examiner*—Victor Batson
*Attorney, Agent, or Firm*—Foley & Lardner

[57] ABSTRACT

A system for physically positioning a hitch assembly at an initialized position prior to subsequent automatic control of the hitch position. The system includes an actuator for positioning an implement coupled to a work vehicle in response to control signals generated by a control circuit. The control circuit compares the sensed implement position to a predetermined position and, based upon the comparison, commands movement of the implement to an initialized position upon receipt of an input signal generated by an input device. The system may include an upper limit device or position command device used to set the predetermined position, and may include a display which indicates when the implement position is above the upper limit position or not equal to the commanded position. The input signal may be processed in another manner when the implement position is not above the limit position and is equal to the commanded position upon start-up. A method includes the steps of detecting the actual position of a structure which supports the implement, comparing the actual position to a predetermined position, awaiting an operator-induced initialization signal based upon the comparison, and moving the support structure to an initialized position following receipt of the initialization signal.

15 Claims, 4 Drawing Sheets

HITCH INITIALIZATION CONTROL SYSTEM

FIELD OF THE INVENTION

The present invention generally relates to a control system for initializing the position of an implement coupled to a work vehicle. The invention particularly relates to a control system for positioning an implement at an initialized position prior to subsequent automatic control of the implement position.

BACKGROUND OF THE INVENTION

Control systems for controlling the position of a hitch assembly coupled to a work vehicle, such as an agricultural tractor, are generally known and typically include position and draft feedback devices coupled to the hitch assembly, position and load command devices accessible from an operator station or cab, and a controller including a microprocessor for receiving and processing inputs from the feedback and command devices. Based upon these inputs, the controller typically outputs control signals to a positioning system including a hydraulic cylinder for raising and lowering the hitch in accordance with the operator-induced command signals. A hitch control system of this general type is described in U.S. Pat. No. 5,421,416, commonly owned with the present application and incorporated herein by reference.

Certain systems of the type described above include an upper limit input device that allows the operator to select a maximum upper or raised position for the hitch. The input device typically includes a knob coupled to a potentiometer that generates a signal recognized by the controller as the upper limit position. During manual or automatic control of the hitch assembly, such control systems typically do not permit movement of the hitch above the upper limit position.

Difficulties encountered in such control systems occur when, upon start-up of the tractor, the hitch is determined to be located in a position above the upper limit position or in a position that does not correspond with the position command device. Enabling automatic hitch movement under these conditions may result in unexpected, and possibly dangerous, movement of the hitch assembly and associated implement. The former condition may occur when the upper limit knob is adjusted (lowered) when the control system is off, such as after the vehicle is stopped and switched off. In this condition, the controller may be prevented from initiating automatic control of the hitch assembly in accordance with a predetermined automatic control routine until the hitch is captured and manually lowered to the upper limit position (e.g., using a manual position control knob or lever) or the upper limit is manually raised such that the detected hitch position falls within an allowable range. The latter condition may occur when the position command device is adjusted in either direction after the control system is shut off, or the hydraulics allow the hitch to physically move during this period. In this condition, the operator may be required to capture the hitch by adjusting the position command lever. Such approaches to these conditions burden the operator with the need to manually capture hitch position using the position command lever or upper limit device.

Accordingly, it would be advantageous to provide a simplified initialization sequence wherein an operator may capture the hitch and move it to an initialized position without being required to manually alter a position control or upper limit device. There is a need for an improved hitch control system that provides a simple initialization sequence which ensures that the hitch is positioned below an upper limit position prior to the occurrence of automatic control. There is also a need for an improved hitch control system that provides an initialization sequence which ensures that the hitch is positioned at the commanded position prior to the occurrence of automatic control.

SUMMARY OF THE INVENTION

The present invention is directed to an innovative hitch control system designed to respond to these needs. The control system, which may be adapted to a variety of existing vehicles and controllers, enables the operator to initialize the hitch position by a brief sequence of steps performed from the operator station. Where a controller determines that the hitch is located above a maximum allowable position upon initialization of the control system, the controller causes the hitch to move in a controlled manner to an initialized position within a range of allowable positions. Where the controller determines that the hitch is not located at a commanded position, the controller causes the hitch to move in a controlled manner to the commanded position. The system thus alleviates the need for the operator to search for the hitch position via manual movement of a position command lever, or to manipulate an upper limit device to ensure that the hitch position is below a maximum limit.

In accordance with one aspect, the invention relates to a system for initializing the position of an implement coupled to a work vehicle, the implement being positionable by movement of an actuator. The system includes a position sensor for detecting the position of the implement, an operator-actuatable input device configured to generate an input signal, and a control circuit coupled to the position sensor, the input device and the actuator. The control circuit is configured to compare the implement position to a predetermined position upon start-up and, based upon the comparison, to await receipt of the input signal and command movement of the implement to an initialized position upon receipt of the input signal.

In accordance with another aspect, the invention relates to a method for initializing an implement positioning system coupled to a vehicle. The positioning system includes an implement support structure and an actuator configured to move the support structure to various positions in response to control signals from a control circuit. The method includes the steps of (a) detecting the actual position of the support structure; (b) comparing the actual position of the support structure to a predetermined position; (c) based upon the comparison of step (b), awaiting an operator-induced initialization signal; and (d) following receipt of the initialization signal, moving the support structure to an initialized position.

The invention also relates to a system for initializing the position of an implement coupled to a work vehicle, the implement being positionable by movement of an actuator. The system includes a position sensor for detecting the position of the implement, an operator-adjustable reference device configured to generate a reference position signal, an operator-actuatable input switch configured to generate a discrete input signal, and a control circuit coupled to the position sensor, the reference device, the input switch and the actuator. The control circuit is configured to disable automatic implement movement upon start-up based upon a comparison between the implement position and the reference position, and to enable automatic implement movement upon receipt of the input signal.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENT

Before proceeding to the Detailed Description of the Preferred Embodiments, several general comments can be made about the applicability and the scope of the invention. First, while reference is made throughout the following discussion to a tractor having a hitch assembly on which an implement is mounted, it should be understood that the present system is more generally applicable to control systems for work vehicles in general. Thus, a system employing the elements recited in the appended claims, though used with other types of vehicles and/or for performing other functions, is equally within the intended scope of the invention.

Figure 1:
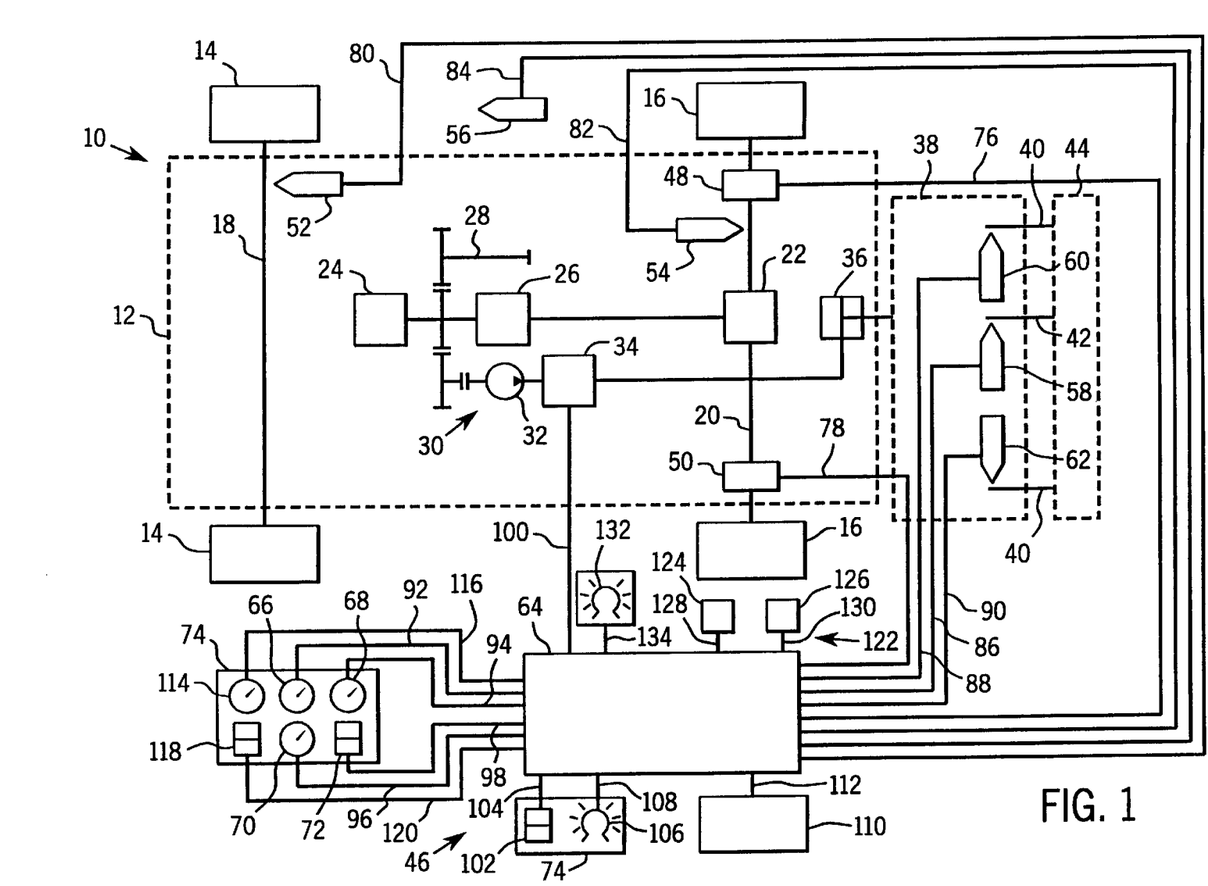
FIG. 1 is a diagrammatical representation of a tractor equipped with a control system for positioning an implement in response to a plurality of operating parameters including implement position and load.

Turning now to the FIGURES and referring first to FIG. 1, a vehicle 10, such as an agricultural tractor, is illustrated diagrammatically as including a body 12 carried by front wheels 14 and rear wheels 16. Front wheels 14 are mounted in a conventional manner on an axle 18 and rear wheels 16 are mounted on a rear axle 20 coupled to a differential 22. Tractor 10 also includes a power plant or engine 24 coupled through a transmission 26 to differential 22 such that engine 24 may selectively drive rear wheels 16 in a number of forward and reverse gears. Tractor 10 typically includes auxiliary systems coupled to engine 24, such as a power take off shaft 28 for driving implements and other detachable equipment. A tractor generally of this type is further described in U.S. Pat. No. 5,421,416 incorporated herein by reference.

A hydraulic system 30 is coupled to engine 24 to provide a source of pressurized fluid for powering various actuators. As illustrated in FIG. 1, hydraulic system 30 includes a hydraulic pump 32 piped to a fluid reservoir (not shown) and to valve assembly 34 for regulating and directing pressurized fluid to various hydraulic components, such as linear actuator, single-acting or double-acting cylinder 36 coupled to a hitch assembly 38. Hitch assembly 38 may be a conventional three-point hitch having lower and upper hitch links 40 and 42 for supporting a working implement 44, such as a plow. Moreover, valve assembly 34 preferably includes solenoid operated proportional valves for directing a flow of pressurized fluid to actuator 36 for raising and lowering hitch assembly 38 and implement 44 as commanded by an operator or control system as described below, such as to vary the penetration of implement 44 into ground being worked. Valve assembly 34 can also be used to raise hitch assembly 38, along with implement 44, to a lifted position wherein the implement is not engaged in a working position with the ground. A lifted position may typically be commanded by the operator or control system during travel of tractor 10 across a road or between fields.

As illustrated in FIG. 1, tractor 10 is equipped with a control system, designated generally by the reference numeral 46 for controlling the position of hitch assembly 38 and implement 44. While control system 46 may include more or fewer of the elements shown in FIG. 1, it may typically include brake sensors 48 and 50 coupled to the rear service brakes of tractor 10, speed sensors 52 and 54 coupled to the front and rear axles 18 and 20, respectively, a true ground speed sensor 56 (e.g., a radar-based speed sensor or non-powered wheel speed sensor in a 2-wheel drive tractor), a hitch position sensor 58 and draft load force sensors 60 and 62. Control system 46 also includes a control circuit 64 and command devices 66, 68, 70, 72, 102, 114 and 118 (described below) which may be provided on a single or multiple control consoles 74 in the tractor cab. Control system 46 also includes one or more devices to display status or parameter information to the operator, such as a slip indicator lamp 106, an enable lamp 132 and a display 110 (described below).

In operation, brake sensors 48 and 50 detect the application of the tractor service brakes and generate braking signals upon application of the brakes. These braking signals are applied to control circuit 64 via conductors 76 and 78, respectively. Of course, for control systems employing control routines that do not make use of braking signals, sensors 48 and 50 may be omitted. Speed sensors 52 and 54, which may include a variable inductance magnetic pickup sensor, detect the rotational velocity of front wheels 14 and rear wheels 16, respectively, and generate signals representative thereof. These speed signals are transmitted to control circuit 64 via conductors 80 and 82. A tractor 10 may also include a ground speed sensor 56 to measure the true speed of tractor 10 with respect to the ground. Sensor 56 typically includes a radar device mounted to body 12 of tractor 10 which emits radar signals toward the ground and receives a portion of the signals rebounding from the ground to determine the ground speed. Sensor 56 then generates a speed signal representative of the tractor speed and transmits this signal to control circuit 64 via conductor 84. Alternatively, ground speed sensor 56 could include a receiver for receiving sequential signals from a satellite positioning system such as the Global Positioning System (GPS), with the ground speed equal to the change between sequential positions divided by the elapsed time. Speed sensor 52 could also be used to measure ground speed since it senses the rate of rotation of a non-driven front wheel 14 of tractor 10.

The signals produced by sensors 48 through 56 are used as inputs by control circuit 64 to regulate various functions of tractor 10 in accordance with preset, cyclical control routines. For instance, braking signals from sensors 48 and 50 may be used to control engagement and disengagement of a locking circuit for differential 22. Speed signals from sensors 52, 54 and 56 may be used to calculate a driven wheel slip value for use in controlling implement position. Moreover, other, additional sensors may be provided on tractor 10 for use in additional control routines. For example, such sensors might provide signals indicative of engine speed for use in regulating engine throttling or implement position as desired. Moreover, it should be understood that the various control functions required for operation of tractor 10, including the implement control functions discussed below, may be executed by a single control circuit 64 or by separate, dedicated control circuits taking as inputs only the parameter signals necessary for their precise function.

Control of the position of implement 44 is generally based upon information relating to the sensed implement position and draft load force. This information is provided via position sensor 58 and draft load sensors 60 and 62. Thus, position sensor 58, which is typically a rotary or linear potentiometer or linear variable differential transformer (LVDT) coupled to a linkage 42 of the tractor hitch assembly 38, detects the position or elevation of implement 44 with respect to body 12 and generates a position signal representative thereof. This position signal is conveyed to control circuit 64 via a conductor 86. Draft load sensors 60 and 62, which typically include resistance strain gauges applied to links 40 of hitch assembly 38, generate draft load signals representative of the force exerted on links 40. These draft load signals are transmitted to control circuit 64 via conductors 88 and 90, respectively. Thus, control circuit 64 receives signals representative of both the position of implement 44 and either the draft force generated by interaction of implement 44 with the ground or, when implement 44 is in a lifted position, the load exerted by implement 44 on links 40. When tractor 10 is stopped and implement 44 is in a lifted position, the load sensed by sensors 60 and 62 is related to the weight of the implement.

In addition to sensed values of the operating parameters discussed above, control circuit 64 receives command or reference values from command devices 66, 68, 70, 72, 114 and 118, which typically include switches and potentiometers positionable via suitable knobs or handles (not shown). For the purposes of implement position control, command device 66 provides an implement position command signal representative of the desired position of implement 44. Command device 68 provides a draft command value representative of the desired level of draft force on implement 44. Command device 70 is an operator-adjustable upper limit selector for setting the maximum allowable raised physical position of hitch assembly 38, hereinafter referred to as the upper limit, beyond which control system 46 may not move assembly 38. Command device 72 is an implement position override switch that includes an UP position, a DOWN position and a spring-biased momentary DOWN position accessible from the DOWN position. Command device 114 is an operator-adjustable drop rate device for setting a desired drop rate of actuator 36.

Although the foregoing command input devices are preferred, a given control system may not use every command device described above, and other command devices may provide other inputs, such as spare command device 118, for control of various functions of tractor 10. For example, control system 46 may also include an operator-adjustable raise rate command device for setting a desired raise rate of actuator 36 independently of drop rate command device 114. Control system 46 may also include a travel knob or response rate knob as described in U.S. Pat. No. 5,421,416, mentioned above.

Signals from devices 66, 68, 70, 72, 114 and 118 are applied to control circuit 64 via conductors 92, 94, 96, 98, 116 and 120, respectively. Based upon the command or reference values supplied by command devices 66, 68, 70, 72, 114 and 118, and upon the sensed values from sensors 48 through 62, control circuit 64 generates control signals for raising and lowering implement 44 and applies these control signals to valve assembly 34 via conductor 100 to move actuator 36.

In a control system equipped for slip control, control circuit 64 also receives a command from command device 102. Command device 102 is used for turning a slip control function on and off and for setting a slip limit. Command device 102 is preferably a three-position rocker switch selectively movable between OFF, ON and SET positions. The SET position of command device 102 is accessible from the ON position and is a momentary position maintained as long as the operator holds command device 102 in the SET position. A signal indicative of the position of command device 102 is applied to control circuit 64 via conductor 104. The slip control system also includes a slip indicator lamp 106. Lamp 106 is activated by a signal supplied by control circuit 64 via conductor 108 when a slip control override function is engaged to raise hitch assembly 38 to reduce wheel slip to a desired range.

Control system 46 may also include an enable lamp 132 and a display 110 controlled by control circuit 64 via conductors 134 and 112, respectively. Enable lamp 132 is operable in three different modes or conditions:

(1) OFF; (2) FLASHING; or (3) ON. When enable lamp 132 is OFF, control system 46 is working properly. When lamp 132 is FLASHING, control system 46 is disabled and must be enabled to become operational. When lamp 132 is ON, a failure condition exists and the operator may refer to display 110 for an error code which indicates the type of failure condition detected. The operation of enable lamp 132 and display 110 are described further in U.S. Pat. No. 5,421,416, mentioned above.

Control system 46 also includes a remote switch assembly 122 for commanding elevational movements of hitch assembly 38. Remote switch assembly 122 preferably includes a pair of remote momentary switches 124 and 126 fender-mounted near the rear of tractor 10. Remote switches 124 and 126 are momentary UP and DOWN switches coupled to control circuit 64 via conductors 128 and 130, respectively. Switches 124 and 126 could be replaced with an appropriate single switch.

While in the foregoing description of control system 46 the various sensors and command devices are shown coupled directly to circuit 64, other system structures and architectures may be used. For example, control circuit 64 may be one of several peer, master or slave controllers provided on vehicle 10 for different subsystems, such as PTO operation, an operator's console, transmission operation and the like. In such cases, control circuit 64 may be coupled to other controllers via a communications databus and some or all of the sensors and command devices needed to carry out the functions of control circuit 64 may be assigned and interfaced directly with other controllers on the vehicle. The various parameter signals needed by control circuit 64 could be communicated to control circuit 64 via the communications databus and circuit 64 would include communications interface circuitry adapted to recognize and record necessary signals from the databus. Moreover, circuit 64 may be adapted to output control signals via the communications databus to be received by other system controllers such that the control functions are executed by such other system controllers.

Figure 2:
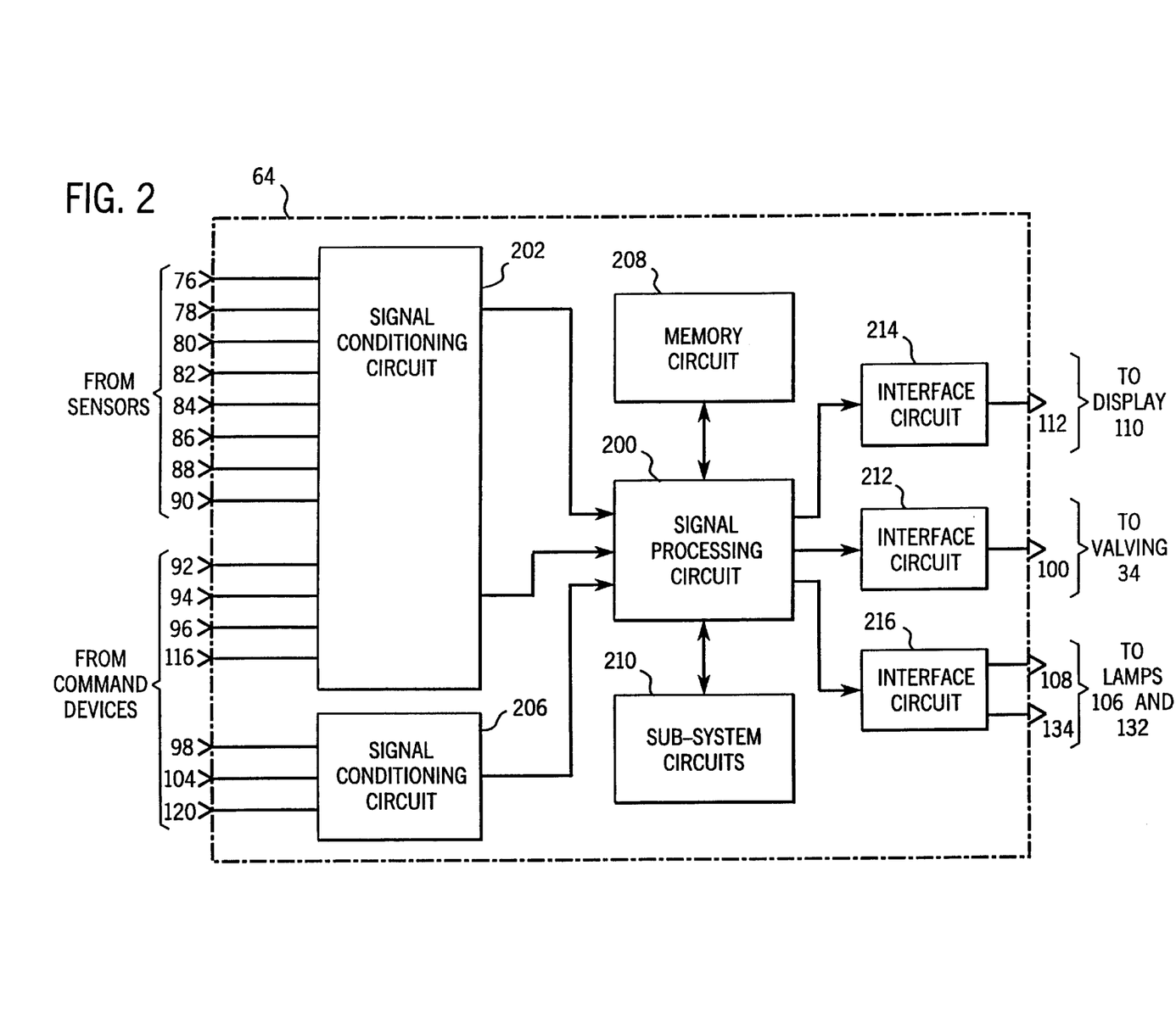
FIG. 2 is a block diagram illustrating certain of the principle circuits included in the controller for the system shown in FIG. 1.

Certain of the sub-circuits included in control circuit 64 are illustrated diagrammatically in FIG. 2.

Control circuit 64 includes a signal processing circuit 200 coupled to a number of other circuits including signal conditioning circuits 202 and 206, a memory circuit 208, one or more subsystem circuits 210 including circuits such as a response signal generating circuit or an initialization circuit, and output signal interface circuits 212, 214 and 216. While these various circuits are illustrated in FIG. 2 as separate, interconnected elements, it should be understood that all or some of these circuits may be included in a single integrated circuit and may comprise internal circuitry of an appropriately configured or programmed microprocessor.

Input signals transmitted from sensors and command devices to control circuit 64 via conductors 76 through 96 and 116 are applied to signal processing circuit 200 through a signal conditioning circuit 202, which typically includes an analog-to-digital converter circuit and appropriate isolation, depending upon the type of sensors and command devices utilized and the nature of the signals produced. More than one analog-to-digital converter may be used to increase the conversion bandwidth. Circuit 202 receives the input signals from the sensors and command devices, produces digital signals or values representative of the various input signals and applies these values to signal processing circuit 200. Circuit 206 receives command input signals from other command devices via conductors 98, 104 and 120, which are generally discrete (e.g., on/off) signals for controlling operation of signal processing circuit 200. Circuit 206 typically includes a multiplexer and appropriate isolation, permitting signal processing circuit 200 to select and access signals applied to circuit 206.

Memory circuit 208, which may include several different memory modules, preferably includes both volatile and non-volatile memory, such as random access memory (RAM), electronically programmable read only memory (EPROM), electronically erasable programmable read only memory (EEPROM) and FLASH memory. The volatile memory of circuit 208 is generally used to store various parameter and intermediate values used during the control functions of signal processing circuit 200. Non-volatile memory, such as FLASH memory or EPROM, serves to store the cyclic control routine implemented by signal processing circuit 200, while other non-volatile memory, such as EEPROM, stores calibration values and failure signals indicative of failure or non-responsiveness of system components.

Other subsystem circuits 210, such as a response signal generating circuit or an initialization circuit, may be included in the circuitry of signal processing circuit 200, but are illustrated separately here for explanatory purposes. The response signal generating circuit receives values representative of sensed implement position and sensed implement draft or load and generates a response signal to control the movement of implement 44. The response signal is applied to signal processing circuit 200 to adjust control signals generated by circuit 200. The adjusted control signals, in the form of pulse-width-modulated (PWM) output signals, are applied to output signal interface circuit 212. Circuit 212 includes appropriate valve drivers for energizing the solenoids of valve assembly 34, thereby moving actuator 36 in a desired direction and at a desired rate. The rate of movement of actuator 36 is preferably proportional to the duty cycle of the control signals. The adjusted control signals produced by circuit 200 could have forms other than PWM signals and, where actuators other than hydraulic cylinders and the like are used for moving the implement, these control signals are adapted for the particular actuator used. The initialization circuit receives signals from signal processing circuit 200 indicative of the position of hitch assembly 38, the upper limit position from command device 70, and the state of switching device 72. The initialization circuit then generates signals for moving hitch assembly 38 to an initialized position upon start-up of control system 46, as described more fully below. These initialization signals are applied to signal processing circuit 200 and are used to generate output control signals as described above in relation to the response signals.

Circuit 200 also produces control signals applied to interface circuit 216 which generates output signals coupled to slip indicator lamp 106 and enable lamp 132 via conductors 108 and 134, respectively, to provide on/off control of lamps 106 and 132. In addition, circuit 200 produces a control signal applied to interface 214 which drives display 110 via conductor 112.

Generally, automatic control of the position or elevation of implement 44 is carried out as follows. Control circuit 64 monitors the command or reference values for implement position and draft force set by command devices 66 and 68, respectively. These values are filtered and compared to sensed position and draft force values read from sensors 58, 60 and 62 according to a cyclic control routine. A number of such routines, following a variety of control schemes, are known in the art and do not, in themselves, form part of the present invention. While different manufacturers may utilize different control routines, depending upon the type and class of vehicle being controlled and upon the parameters governing implement movement, these routines typically generate control signals for moving the implement up or down depending upon the deviation of the sensed values of at least the draft force and implement position from the reference values for these parameters. Moreover, these routines may select the greater of two or more parameter error values or combine two or more parameter error values to generate the implement control signals. Most known systems of this type ultimately generate control signals in the form of PWM signals, the duty cycle of which is proportional to the error signal forming the basis for control. These PWM signals are then applied, through an appropriate valve driver, to the solenoid coil of a proportional hydraulic valve to raise or lower the implement at a rate proportional to the PWM control signal duty cycle. A control system which executes a control routine such as the above is described in U.S. Pat. No. 5,421,416, incorporated herein by reference.

Figure 3:
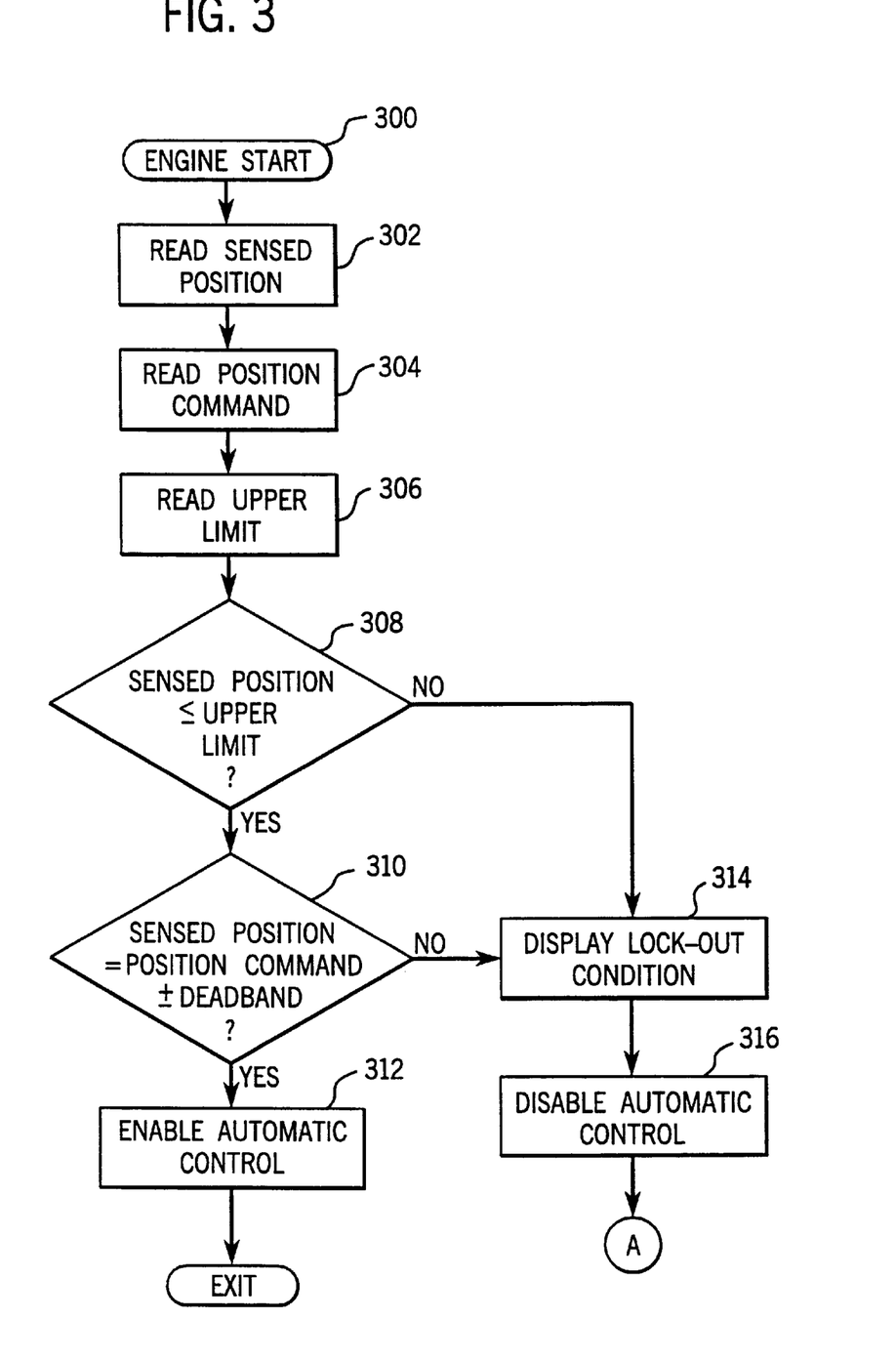
FIGS. 3 and 4 are flow charts representing typical control logic for initializing the position of a hitch assembly such as that shown in FIG. 1 to ensure that the hitch assembly is within an allowable range of positions prior to automatic control of the hitch position.

Referring to FIG. 3, control system 46 is preferably enabled concurrently with starting engine 24 of tractor 10 at step 300. At steps 302–306, control circuit 64 reads the sensed position of implement 44 from position sensor 58, the commanded position from command device 66, and the upper limit position from command device 70. At steps 308–312, automatic control of implement 44 is enabled when the sensed implement position is not above the upper limit position and the sensed implement position is within a deadband (e.g., +/−5 or 10 counts) of the commanded position. However, if sensed implement position is above the upper limit, control circuit 64 alerts the operator that automatic control of hitch movement is locked out by sending appropriate control signals to enable lamp 132 and display 110 (at step 314). Enable lamp 132 informs the operator that control system 46 is not enabled and display 110 indicates that manual intervention is needed before hitch assembly 38 will respond to command devices 66 or 70. Display 110 currently uses a "−" (bar) for this purpose, but other displays may be used. At step 316, control circuit 64 disables automatic control of hitch assembly 38. In FIG. 3, control circuit 64 responds in a similar manner when the hitch is not "captured" (i.e., when sensed implement position is not within a deadband of commanded position). However, in a presently preferred embodiment, the operator enables control system 46 in this condition by moving control lever 66 to "capture" the actual hitch position.

Figure 4:
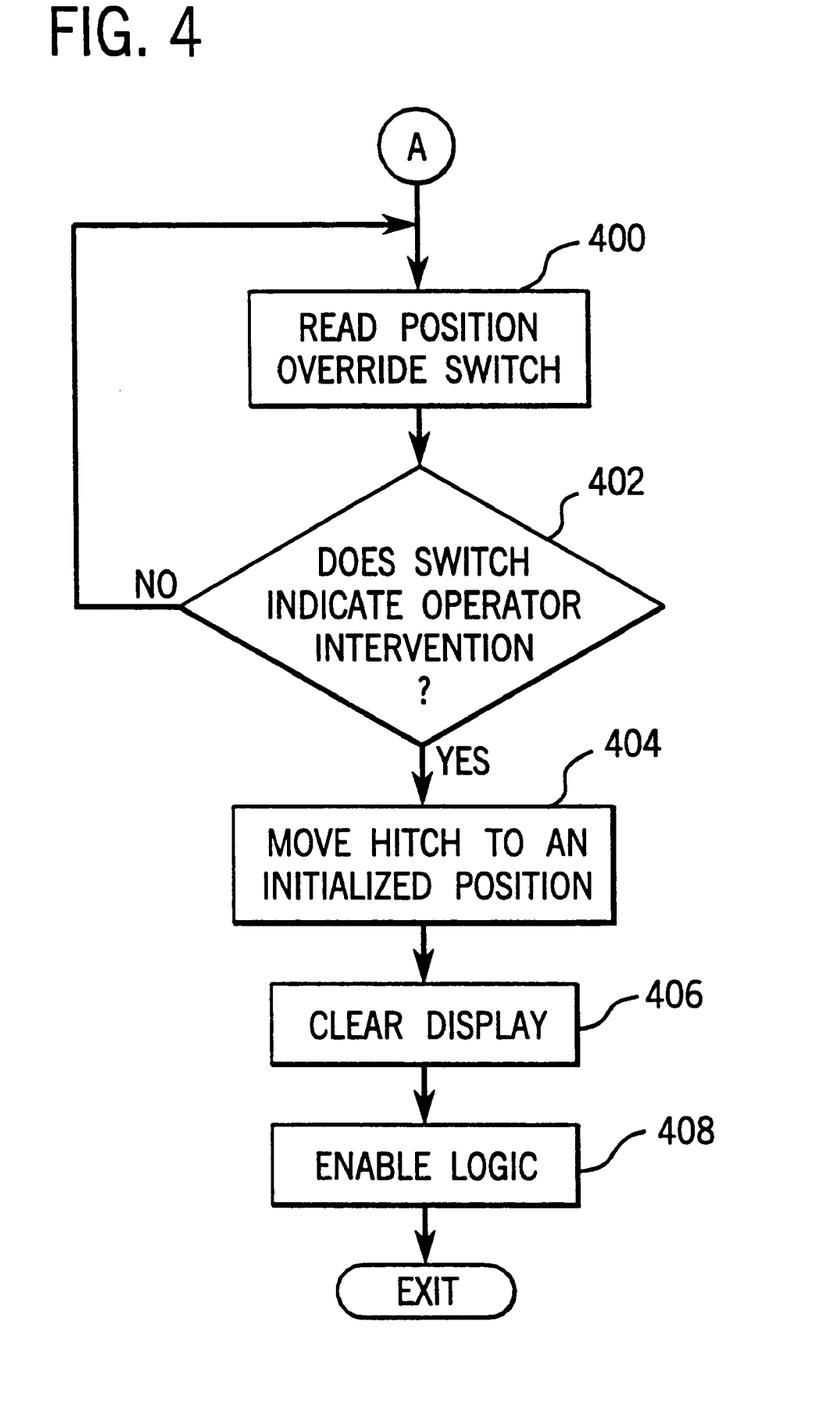

Control circuit 64 executes the steps generally shown in FIG. 4 after disabling automatic control at step 316. In general, after detecting a lock-out condition, control circuit 64 waits for the operator to manually intervene before enabling automatic control of implement position. At steps 400–402, control circuit 64 monitors switch assembly 72 and waits for the operator to appropriately manipulate switch assembly 72. For example, in a presently preferred embodiment, control circuit 64 waits for switch assembly 72 to be pushed to its momentary DOWN position. Alternatively, control circuit 64 could wait for switch assembly 72 to be toggled between its DOWN and UP positions, or control system 46 could include a separate input device dedicated to the function of enabling automatic hitch control in response to a lock-out condition. However, using an existing operator input device to perform this function decreases the cost and increases the reliability of control system 46.

At step 404, control circuit 64 applies control signals to hitch assembly 38 to move implement 44 to an initialized position. The rate of movement is set to a slow rate. If the lock-out condition occurred because the implement position was above the upper limit position, the initialized position is the upper limit position. Alternatively, control circuit 64 could be programmed to move implement 44 to either the upper limit position or the commanded position (set by the current position of command device 66) depending upon the specific operator intervention. For example, implement 44 could be moved to the upper limit position if switch assembly 72 was toggled to its UP position, or to the commanded position if switch assembly 72 was pushed into its momentary DOWN position. If the lock-out condition occurred because the implement position did not match the commanded position, the initialized position could be the commanded position.

At step 406, control circuit 64 causes display 110 to indicate that the lock-out condition no longer exists. At step 408, control circuit 64 executes logic to enable control of implement position. In a preferred embodiment in which the hitch was moved to the upper limit position at step 404, enable lamp 132 remains in the FLASHING mode until the operator moves control lever 66 to "capture" the hitch at the upper limit position. Once captured, enable lamp 132 is turned OFF to inform the operator that the lock-out logic is complete and automatic control of implement position is enabled. Alternatively, when the initialized position at step 404 is the commanded position, control circuit 64 sets enable lamp 132 to the OFF mode and automatic control of implement position is enabled.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims. For example, the various flowcharts only generally represent the steps used by the control system. The logic shown in FIGS. 3 and 4 could be executed as part of the initialization logic executed by control circuit 64 before entry into the cyclical control algorithm, or could be executed as part of the cyclical control algorithm. Different hardware and software implementations that fall within the scope of the appended claims would be apparent to a person of skill in the art.

What is claimed is:

1. A system for initializing the position of an implement coupled to a work vehicle, the implement being positionable by movement of an actuator, the system comprising:

a position sensor for detecting a position of the implement;

an operator-actuatable input device configured to generate an input signal;

an operator-adjustable upper limit device configured to generate a signal indicative of an upper limit position wherein said operator-adjustable upper limit device is different from the operator-actuatable input device;

an operator-adjustable position command device, configured to provide a signal indicative of a commanded position, and a control circuit coupled to the position sensor, the input device, the operator-adjustable upper limit device, and the actuator, the control circuit configured to compare the implement position to the upper limit position indicated by the signal generated by the upper limit device upon start-up and, based upon the comparison, to await receipt of the input signal and command movement of the implement to an initialized position upon receipt of the input signal.

2. The system of claim 1 wherein the control circuit is configured to command movement of the implement to the initialized position upon receipt of the input signal when the implement position is above the upper limit position, and the initialized position is equal to or below the upper limit position.

3. The system of claim 1 further comprising a display configured to provide an indication when the implement position is above the upper limit position.

4. The system of claim 1 wherein the control circuit is configured to process the input signal as an initialization signal when the implement position is above the upper limit position upon start-up, and to process the input signal in another manner in other operating conditions.

5. The system of claim 1 wherein the control circuit is configured to command movement of the implement to the initialized position upon receipt of the input signal when the implement position is not substantially equal to the commanded position, and the initialized position is the commanded position.

6. The system of claim 1 further comprising a display configured to provide an indication when the implement position is not substantially equal to the commanded position.

7. The system of claim 1 wherein the control circuit is configured to process the input signal as an initialization signal when the implement position is not substantially equal to the commanded position upon start-up, and to process the input signal in another manner in other operating conditions.

8. A method for initializing an implement positioning system coupled to a vehicle, the positioning system including an implement support structure and an actuator configured to move the support structure to various positions in response to control signals from a control circuit, the method comprising the steps of:

(a) detecting an actual position of the support structure;

(b) comparing the actual position of the support structure to an upper limit position indicated by a signal generated by an operator-adjustable upper limit device;

(c) based upon the comparison of step (b) indicating that the actual position is above the upper limit position, awaiting an operator-induced initialization signal generated by an operator-actuatable input device different from the operator-adjustable upper limit device; and (d) following receipt of the initialization signal, automatically moving the support structure to an initialized position.

9. The method of claim 8 further comprising the step of producing an operator-perceptible signal based upon the comparison of step (b).

10. The method of claim 9 wherein the operator-perceptible signal is a visual display indicating that the actual position of the support structure is above the upper limit position.

11. The method of claim 8 wherein the method is executed only upon start-up of the control circuit.

12. The method of claim 8 wherein the initialized position is the predetermined position.

13. A system for initializing the position of an implement coupled to a work vehicle, the implement being positionable by movement of an actuator, the system comprising:

a position sensor for detecting a position of the implement;

an operator-adjustable upper limit device configured to generate an upper limit position signal;

an operator-actuatable input switch configured to generate a discrete input signal wherein said input switch is different than the operator adjustable upper limit device;

an operator-adjustable position command device, configured to provide a signal indicative of a commanded position, and a control circuit coupled to the position sensor, the upper limit device, the input switch and the actuator, the control circuit configured to disable automatic implement movement upon start-up based upon a comparison between the implement position and the upper limit position indicating that the implement position is above the upper limit position, and to enable automatic implement movement upon receipt of the input signal.

14. The system of claim 13 wherein the control circuit is further configured to command movement of the implement to an initialized position during the transition to automatic implement movement.

15. The system of claim 13 wherein the input signal is used for a purpose other than to enable automatic implement movement during other operating conditions.

\* \* \* \* \*